United States Patent
Donnici et al.

(12) 
(10) Patent No.: US 10,606,477 B1
(45) Date of Patent: Mar. 31, 2020

(54) INTELLIGENT KEYBOARD

(71) Applicant: Sprint Communications Company L.P., Overland Park, KS (US)

(72) Inventors: Gina R. Donnici, Lee's Summit, MO (US); Timothy K. McGinnis, Overland Park, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 203 days.

(21) Appl. No.: 15/867,700

(22) Filed: Jan. 11, 2018

(51) Int. Cl.
*G06F 3/0488* (2013.01)
*G06F 3/0481* (2013.01)
*G06F 16/9535* (2019.01)
*G06F 16/9537* (2019.01)
*G06F 17/27* (2006.01)

(52) U.S. Cl.
CPC ...... *G06F 3/04886* (2013.01); *G06F 3/04817* (2013.01); *G06F 16/9535* (2019.01); *G06F 16/9537* (2019.01); *G06F 17/276* (2013.01)

(58) Field of Classification Search
CPC ............ G06F 3/04886; G06F 3/04817; G06F 16/9535; G06F 16/9537; G06F 17/276
See application file for complete search history.

(56) References Cited

U.S. PATENT DOCUMENTS

| | | | | |
|---|---|---|---|---|
| 5,896,321 | A * | 4/1999 | Miller | G06F 3/023 365/189.15 |
| 6,377,965 | B1 * | 4/2002 | Hachamovitch | G06F 17/276 715/203 |
| 9,836,722 | B2 * | 12/2017 | Keswani | G06Q 10/107 |
| 2005/0143108 | A1 * | 6/2005 | Seo | G06F 17/211 455/466 |
| 2006/0224312 | A1 * | 10/2006 | Imanishi | G01C 21/3611 701/425 |
| 2015/0018024 | A1 * | 1/2015 | Cohen | G06Q 30/02 455/466 |
| 2017/0045953 | A1 * | 2/2017 | Rogers | G06F 17/276 |
| 2017/0180276 | A1 * | 6/2017 | Gershony | H04L 51/02 |
| 2017/0228471 | A1 * | 8/2017 | Tomkins | G06Q 30/0261 |
| 2018/0329622 | A1 * | 11/2018 | Missig | G06F 17/24 |

\* cited by examiner

*Primary Examiner* — Shourjo Dasgupta

(57) ABSTRACT

A method of providing a keyboard input on a touchscreen display of a mobile communication device. The method comprises receiving a plurality of keywords indexed to completion action recommendations by a client keyboard application executing on a mobile communication device, where the completion action recommendations define suggestions for completing a partial keyboard input string, storing the keywords indexed to completion action recommendations on the device, searching the stored keywords by the client keyboard application based on an identity of the application executing on the device that is associated with a keyboard input, based on a current location of the device, and based on at least one word in the partial keyboard input string, and providing a prompt associated with the completion action recommendation found based on the search of the stored keywords on the touchscreen of the device, whereby inputting data via the keyboard to the application executing is promoted.

19 Claims, 10 Drawing Sheets

INTELLIGENT KEYBOARD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may execute utilities and applications such as a short message service utility, a multimedia message service utility, a web browser application, a gaming application, and others. The utilities or applications may provide a keyboard for inputting user commands or for creating messages. Each utility or application may provide its own keyboard, for example to achieve a desired look and/or user experience for the utility or application.

SUMMARY

In an embodiment, a method of providing a keyboard input on a touchscreen display of a mobile communication device is disclosed. The method comprises transmitting a keyboard context message by a client keyboard application executing on a mobile communication device via a wireless communication link, where the keyboard context message comprises a partial keyboard input string, an identity of an application executing on the device that is associated with a keyboard input presented on a touchscreen of the device, a behavior history associated with a different application that previously executed on the device, an indication of current location of the device, and an indication of an identity of a wireless communication subscriber associated with the device and receiving the keyboard context message by a server keyboard application executing on a computer system. The method further comprises searching a keyword data store by the server keyboard application based on the identity of the application executing on the device that is associated with the keyboard input, based on the behavior history associated with a different application that previously executed on the device, based on the indication of current location of the device, and based on the indication of the identity of the subscriber, and based on at least one word in the partial keyboard input string, accessing a behavioral profile by the server keyboard application in a behavioral data store based on the indication of the identity of the subscriber, analyzing a return from the search of the keyword data store by the server keyboard application based on a current time, based on a behavior history associated with a different application that previously executed on the device, and based on the accessed behavioral profile, and determining a completion action recommendation by the server keyboard application based on the analyzing. The method further comprises transmitting the completion action recommendation by the server keyboard application to the client keyboard application and providing a prompt associated with the completion action recommendation by the client keyboard application on the touchscreen of the device, whereby inputting data via the keyboard to the application executing on the mobile communication device is promoted. The method further comprises capturing keyboard input completion information by the client keyboard application, transmitting the keyboard input completion information by the client keyboard application, analyzing the keyboard input completion information, and adapting the process of analyzing returns from the search of the keyword data store based on analyzing the keyboard input completion information.

In another embodiment, a method of providing a keyboard input on a touchscreen display of a mobile communication device is disclosed. The method comprises transmitting a keyboard context message by a client keyboard application executing on a mobile communication device via a wireless communication link, where the keyboard context message comprises a partial keyboard input string, an identity of an application executing on the device that is associated with a keyboard input presented on a touchscreen of the device, and an indication of current location of the device and receiving the keyboard context message by a server keyboard application executing on a computer system. The method further comprises searching a keyword data store by the server keyboard application based on the identity of the application executing on the device that is associated with the keyboard input, based on the indication of current location of the device, and based on the indication of the identity of the subscriber, and based on at least one word in the partial keyboard input string, analyzing a return from the search of the keyword data store by the server keyboard application based on a current time, and determining a completion action recommendation by the server keyboard application based on the analyzing, where the completion action recommendation comprises an icon and metadata associated with the icon. The method further comprises transmitting the completion action recommendation by the server keyboard application to the client keyboard application, presenting the icon associated with the completion action recommendation by the client keyboard application on the touchscreen of the device, presenting text associated with the icon that is defined by the metadata associated with the icon on the touchscreen by the client keyboard application, and inserting the text associated with the icon by the client keyboard application into the keyboard input string in response to selection of the icon by an input to the touchscreen. The method further comprises inserting an intent identified in the metadata associated with the icon by the client keyboard application into the keyboard input string in response to selection of the icon by an input to the touchscreen, sending a message containing the keyboard input string comprising the intent to a receiving mobile communication device, presenting the keyboard input string by the receiving mobile communication device, and executing the intent in the keyboard input string by the receiving mobile communication device, where the intent one of identifies an executable or comprises executable instructions.

In yet another embodiment, a method of providing a keyboard input on a touchscreen display of a mobile communication device is disclosed. The method comprises receiving a plurality of keywords indexed to completion action recommendations by a client keyboard application executing on a mobile communication device from a server keyboard application, where the completion action recommendations define suggestions for completing a partial keyboard input string, storing the plurality of keywords indexed to completion action recommendations on the mobile communication device, searching the stored keywords indexed to completion action recommendations by the client keyboard application based on an identity of the application executing on the device that is associated with a keyboard input, based on a current location of the device, and based on at least one word in the partial keyboard input string, and providing a prompt associated with the completion action recommendation found based on the search of the stored keywords by the client keyboard application on the touchscreen of the device, whereby inputting data via the keyboard to the application executing on the mobile communication device is promoted.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
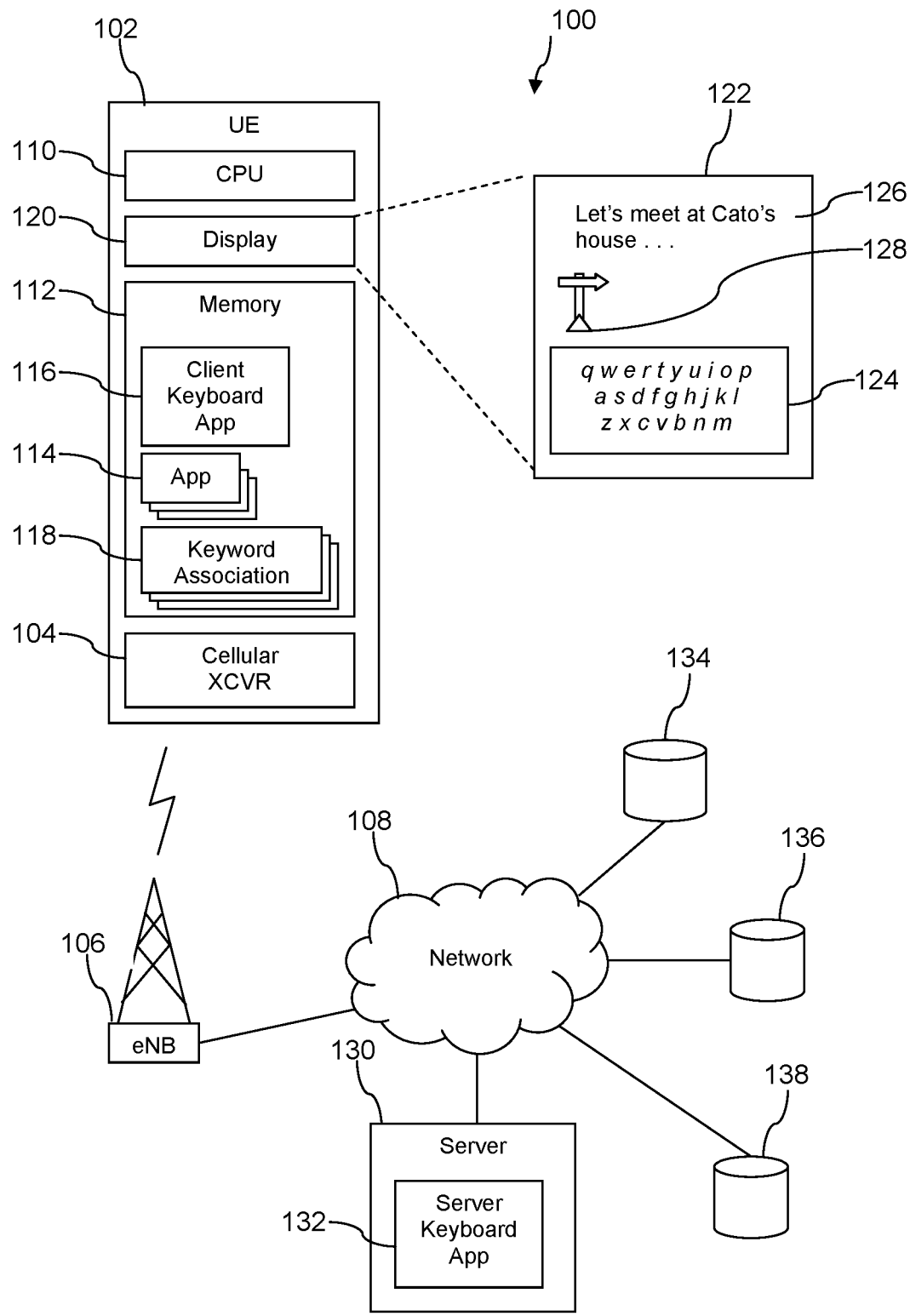
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches an intelligent keyboard application on a mobile communication device that provides recommendations for completion of partial input strings based on context. Input string completion in keyboard applications currently may be subject to a variety of limits. One of these limits is the restriction of the concept of context to the narrow scope of the in-progress input string. The present disclosure significantly expands the context that is used to generate input string completion suggestions. Another limit may be related to the character of input that can be provided as a recommendation. The present disclosure provides for embedding executable instructions or references to executable instructions that make the input string completion dynamic in nature.

The present disclosure teaches determining input string completion recommendations based on keywords in the partial input string, based on a current time, based on a location of the device, and based on a behavioral profile of a wireless communication service subscriber associated with the device, all of which may be referred to as a context of the partial input string. The context may further comprise recent user behavior history associated with a different application (different from the foreground application currently using the intelligent keyboard facility to provide user input to the foreground application). It may be said that the intelligent keyboard application provides a completion action recommendation based on keywords and based on a use context, where the use context is one or more of the time, location, identity of a foreground application using the intelligent keyboard application, a recent user behavior history in a different application, or behavioral profile.

A client keyboard application executing on the mobile communication device may build and transmit a keyboard input context message to a server keyboard application executing on a computer system. The server keyboard application may search a data store based on the keywords provided in the context message to obtain one or more completion action recommendations. The server keyboard application may then select one completion action recommendation based on the remainder of the context provided by the context message. The server keyboard application then sends the selected completion action recommendation to the client keyboard application, and the client keyboard application processes the completion action recommendation appropriately.

The client keyboard application may process the completion action recommendation in various ways. The completion action recommendation may provide a suggested word completion or a plurality of words. A user of the mobile communication device may accept the recommendation by providing an input to the touchscreen, and the subject word completion or plurality of words may be appended to the in-progress keyboard input string. When the user clicks to send the keyboard input, the input is then provided to the executing application associated with the keyboard. The executing application may be a text message application such as a short message service (SMS) application of a media message service (MMS) application, a web browser application, a mobile gaming application, or other application executing on the mobile communication device.

The completion action recommendation may comprise metadata and an icon, and the client keyboard application may process the completion action recommendation by presenting the icon in the keyboard. If the user interacts with the icon with a first input metadata associated with the icon may be displayed in the keyboard input string. If the user interacts with the metadata displayed in the keyboard input string, the metadata is incorporated into the input string. If the user then clicks to send the keyboard input, the input along with the metadata is then provided to the executing application associated with the keyboard. An example icon may be a direction sign graphic. If the user interacts with the icon, an address may be displayed. If the user selects the address, the address is incorporated into the keyboard input string. For example, the address may be the address of a named location that was analyzed as a keyword by the server keyboard application to retrieve the address from a data store. Another icon may be a dollar sign or other currency symbol to suggest an artifact associated with a monetary value, such as a coupon or special discount offer. Another icon may be a ticket graphic to suggest information about tickets associated with an event.

The metadata may further comprise an intent—an object that embeds executable instructions or that identifies or references executable instructions for example in a widely distributed library of executable instructions known to be installed on mobile communication devices. The intent can be sent with text in the input string to a destination mobile communication device that can execute the intent. The intent, when executed, may launch a navigation application and display a map to an address also provided in the metadata, for example when the metadata is sent in a text message or an email.

The client keyboard application may capture completed input strings and associated input completion recommendations and send these pairs back to the sever keyboard application as feedback. The server keyboard application or another application may analyze this feedback to iteratively adapt rules or executable instructions for searching the data store and/or for analyzing results returned from the data store based on the context of the in-progress input strings. Further, the benefits obtained from adapting the processing of the server keyboard application based on feedback from a first mobile communication device can be leveraged and applied to thousands or millions of other mobile communication devices. It is noted that this kind of distributive function can promote adapting recommendations to a specific mobile communication device well before the specific mobile communication device ever demonstrates a propensity for a certain behavior or input string probability. Said in other words, the system can adapt to feedback from pioneers in various behaviors, anticipate later change by other users, and serve them better than would have been likely without this distributed feedback system.

In an embodiment, associations of keywords and keyboard completion action recommendations may be provided by the server keyboard application and stored on the mobile communication device. For example, the server keyboard application may refresh keyword to completion action recommendation associations daily, weekly, every two weeks, or on some other schedule. The client keyboard application may then search the on-device store of keyword to completion action recommendation associations itself, which may in some cases promote a quicker completion action recommendation response time. This may be referred to in some contexts as caching keyword to completion action recommendation associations on the mobile communication device.

Tuning now to FIG. 1, a system 100 is described. In an embodiment, the system 100 comprises a mobile communication device (user equipment—UE) 102 having a cellular radio transceiver 104 that can establish a wireless communication link with a cell site (eNB) 106 according to one of a long term evolution (LTE), a code division multiple access (CDMA), a global system for mobile communication (GSM), or a worldwide interoperability for microwave access (WiMAX) wireless communication protocol. The mobile communication device 102 is one of a mobile phone, a smart phone, a personal digital assistant (PDA), a wearable computer, a headset computer, a media player, a laptop computer, a notebook computer, or a tablet computer. When the cellular radio transceiver 104 is wirelessly coupled to the cell site 106, the cell site 106 may communicatively couple the cellular radio transceiver 104 and/or the mobile communication device 102 to a network 108. The network 108 may comprise one or more private networks, one or more public networks, or a combination thereof. The mobile communication device 102 may perform voice calls and/or data sessions via the network 108. While FIG. 1 illustrates a single mobile communication device 102 and a single cell site 106, the system 100 may comprise any number of devices 102 and cell sites 106.

The mobile communication device 102 further comprises a processor 110 and a memory 112. The memory may store a client keyboard application 116 and one or more applications 114. The applications 114 may comprise a web browser application, a short message service (SMS) application, a multimedia message service (MMS) application, an email application, a navigation application, one or more gaming applications, and one or more mobile applications. In an embodiment, the applications 114 and the client keyboard application 116 may be stored in a non-transitory memory portion of the memory 112. In an embodiment, the memory 112 further comprises optional keyword to recommended completion associations 118. The device 102 further comprises a display 120.

As a wireless communication service subscriber uses the mobile communication device 102, for example to make voice calls, to browse the internet, to read email, to play games, occasion may arise for the subscriber to enter input via a keyboard. A keyboard graphical user interface (GUI) 122 may be presented on the display 120, and the subscriber may enter input using an image of a keyboard 124 overlaid onto the GUI 122, for example touching letters with a fingertip. As keys are selected, a keyboard input string 126 may be presented in the GUI 122. In some contexts this may be referred to as a partial keyboard input string, because it has not been committed or transmitted. The GUI 122 may be managed and presented by an application 114 that is executed by the processor 110. The client keyboard application 116 may monitor the keyboard input string 126, for example while it is being composed and before it is committed, and may provide completion prompts in the GUI 122. The client keyboard application 116 may provide an icon and associated metadata to the GUI 122 in response to analyzing the in-progress keyboard input string 126. For example, the GUI 122 may present an icon 128, for example a direction sign graphic. If a user hovers over the icon 128, the GUI 122 may present some of the metadata associated with the icon 128, for example may present an address associated with the icon 128.

By selecting the completion prompts provided by the client keyboard application 116, the task of the subscriber of completing an input string may be made both more convenient and faster. While illustrated in FIG. 1 as separate from the applications 114, in an embodiment, each application 114 embeds the client keyboard application 116 within itself. For example, in an embodiment, a texting application (i.e., a SMS application or a MMS application) embeds the client keyboard application 116 within itself, a web browser application embeds the client keyboard application 116 within itself, an email application embeds the client keyboard application 116 within itself, and/or a navigation application embeds the client keyboard application 116 within itself.

The client keyboard application 116 may send keyboard context messages based on the keyboard input string 126 as the input string is composed to a server keyboard application 132 executing on a computer system 130. Computer systems are described further hereinafter. The keyboard context messages may comprise contextual information comprising one or more of a subscriber identity or proxy for a subscriber identity (such as a mobile equipment identity or a phone number associated with the subscriber), an identity of the application 114 in which the keyboard input string 126 is being composed, a location of the mobile communication device 102, and a partial keyboard input string. The device 102 may determine its location using a GPS receiver of the device 102. The location information in the keyboard context messages may be provided as GPS coordinates. Alternatively, the location information may be determined in a different way and may be stored in the keyboard context messages in a different format. For example, the location information may comprise an identity of the cell site 106 to which the device 102 is currently attached (i.e., receiving coverage from), where the location of the cell site 106 serves as a coarse proxy for the location of the device 102. Alternatively, other location techniques and other location information formats may be employed. The server keyboard application 132 may search the partial keyboard input string for keywords and use those keywords to search a keyword to completion action association data store 134. The server keyboard application 132 may analyze one or more of the items of contextual information received in the keyboard context message to select a completion action from a plurality of completion actions accessed from the keyword to completion action association data store 134.

The server keyboard application 132 may analyze the completion action recommendation further based on a current time and date. The server keyboard application 132 may further use an identity of the subscriber or an indicator of the identity of the subscriber to access profile information associated with the subscriber identity in a profile data store 136. The server keyboard application 132 may select the completion action recommendation further based on the behavioral profile information retrieved from the profile data store 136. The profile information may comprise behavioral information or historical information related to behavior of the subscriber, for example visits to specific restaurants, on-line purchases, navigating to performance venues. The profile information may comprise demographic information related to the subscriber such as gender, age, income level, education level, residence location, marital status, number of children.

The server keyboard application 132 may transmit the completion action via the network 108 to the client keyboard application 116. The client keyboard application 116 can present the completion action recommendation in various ways in the GUI 122. The recommended completion action may be completion text that is presented in the keyboard input string 126 in a format that indicates it is not yet committed to the in-construction input string, for example in a lighter tone, for example with a pulsing intensity, or with dotted line type.

The completion action may comprise an identification of an icon graphic and metadata associated with the icon. For example, a direction icon may be provided to suggest filling in an explicit address in the keyboard input string 126. The explicit address may be contained in the metadata included in the completion action recommendation. Another icon may be a dollar sign symbol or other currency symbol graphic to indicate that a coupon might be applicable. Another icon may be a ticket graphic to indicate that tickets may be needed or may be available for purchase.

As an example, a subscriber may be sending a text message to a co-worker with incomplete message reading "Let's meet at Cato's house." The client keyboard application 116 may capture this in-progress text and send it to the server keyboard application 132. The server keyboard application 132 may search the keyword to completion action recommendation data store 132 for the keyword combination "Cato's house." The query may return an address "Domus 1, Via Apia, Rome." The server keyboard application 132 may return a completion action recommendation to the client keyboard application 116 containing the direction icon graphic and metadata including "Domus 1, Via Apia, Rome." The client keyboard application 116 may present the direction icon graphic. If the subscriber clicks on the direction icon graphic, the metadata "Domus 1, Via Apia, Rome" may display. If the subscriber selects the metadata, "Domus 1, Via Apia, Rome" may be inserted into the keyboard input string 126. If the subscriber then sends the text, the text message "Let's meet at Cato's house Domus 1, Via Apia, Rome" may be transmitted to the addressed co-worker of the subscriber. Said in other words, when the completion action recommendation comprises a direction icon, the metadata may comprise an address.

The communication between the client keyboard application 116 and the server keyboard application 132, the looking up of completion action recommendations, the selection of one completion action recommendation, and the presentation of the completion action recommendation on the GUI 122 desirably occur in real-time so that the subscriber feels that interaction with the GUI 122 is fast and helpful. For example, the time between entering "Cato's house" and the appearance of the direction icon may occur in 1 second or less. It is observed that the server keyboard application 132 is not handling keyboard context messages from one mobile communication device 102 only but rather receiving keyboard context messages from tens of thousands of devices 102, from hundreds of thousands of devices 102, from millions of devices 102.

To support this timing challenge, the server keyboard application 132 may spawn execution threads to handle a keyboard context message received from the client keyboard application 116. Additionally, the keyword to completion action recommendation data store 134 may be structured to promote rapid searches. The thread of execution of the server keyboard application 132 may initiate the search in the keyword to completion action recommendation data store 134 concurrently with a search in the profile data store 136.

In an embodiment, to promote fast responses, the server keyboard application 132 may cache keyword to completion action recommendation associations 118 in the memory 112 of the mobile communication device 102, and the client keyboard application 116 may itself identify keywords and/or keyword combinations in the keyboard input string 126, access one or more completion action recommendations based on the keywords or keyword combinations, and select one completion action recommendation based on the context. In this case the client keyboard application would have much of the selection analysis logic described earlier as belonging to the server keyboard application 132. In this case the server keyboard application 132 may restrict its activities to populating keyword to completion action recommendation associations into the data store 134 and propagating these associations out to a plurality of mobile communication devices 102.

In an embodiment, two mobile communication devices 102 that both feature the client keyboard application 116 and the associated context based completion action recommendation functionality are in communication with each other, for example exchanging text (e.g., SMS or MMS messages). In this case, additional intelligent keyboard functionality can be provided. Mobile communication devices 102 that feature the client keyboard application 116 may be identified in an intelligent keyboard registry data store 138. When a first device 102 initiates a communication with a second device 102, the client keyboard application 116 on the originator device sends a keyboard context message that, with other contextual information, identifies the second device 102, for example provides a phone number or some other address of the second device 102. The server keyboard application 132 may search for the second device 102 (also referred to as the terminating device) in the keyboard registry data store 138. If the second device 102 is represented in the keyboard registry data store 138, the server keyboard application 132 may send information across from the client keyboard application 116 on the originating device 102 to the client keyboard application 116 on the terminating device 102, for example as a system notification. The system notification, for example, may comprise the address of a restaurant or other location that is being described in the communication being composed by the originating device 102.

Figure 2A:
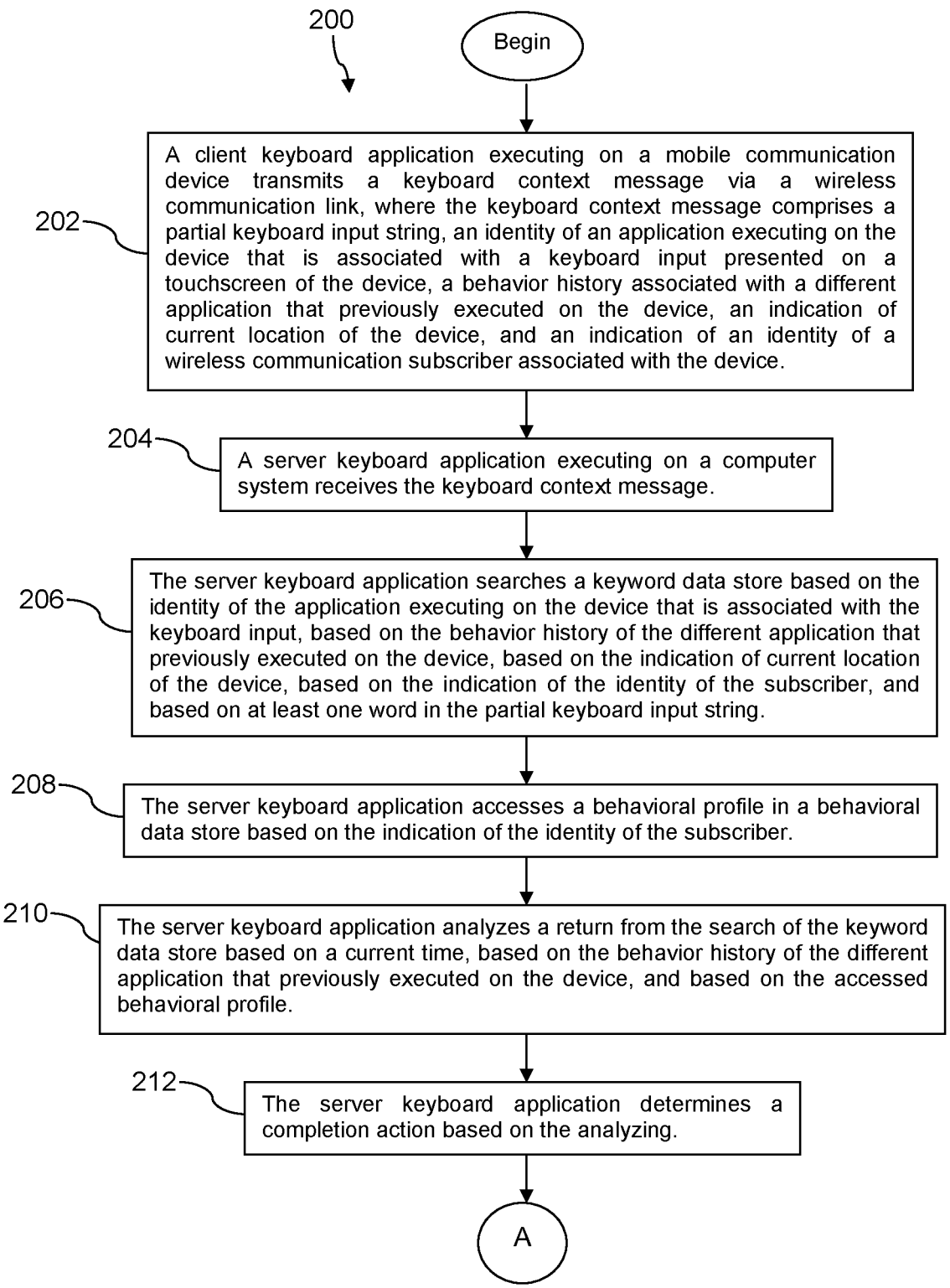
FIG. 2A and FIG. 2B are a flow chart of a method according to an embodiment of the disclosure.
Figure 2B:
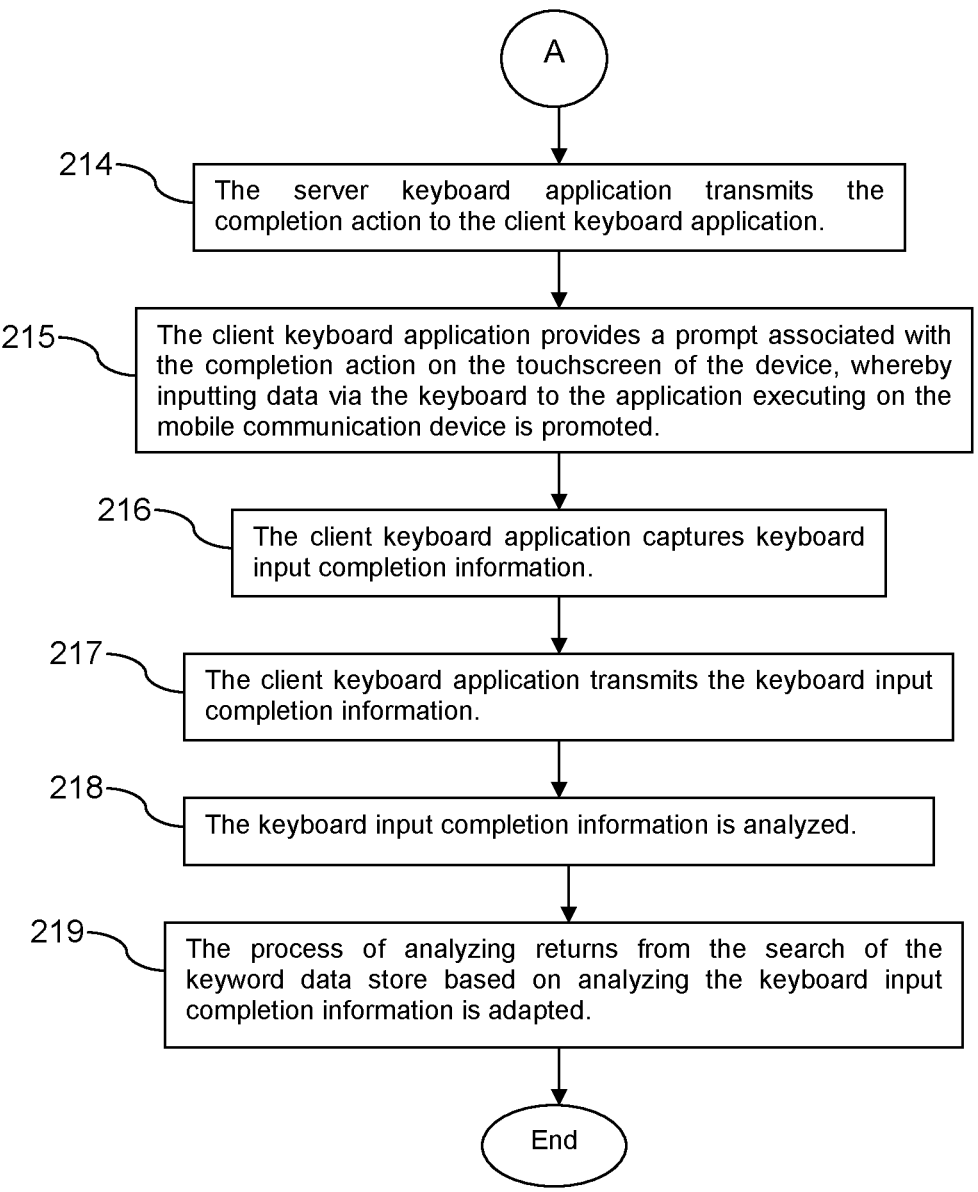

Turning now to FIG. 2A and FIG. 2B, a method 200 is described. At block 202, a client keyboard application executing on a mobile communication device transmits a keyboard context message via a wireless communication link, where the keyboard context message comprises a partial keyboard input string, an identity of an application executing on the device that is associated with a keyboard input presented on a touchscreen of the device, a behavior history associated with a different application that previously executed on the device, an indication of current location of the device, and an indication of an identity of a wireless communication subscriber associated with the device. The behavioral history may be information about web sites browsed and actions taken or inputs provided to the web sites. The previously executed application may have been executed previously that day, for example within the last hour. Alternatively, the previously executed application may have been executed before the current day. At block 204, a server keyboard application executing on a computer system receives the keyboard context message At block 206, the server keyboard application searches a keyword data store based on the identity of the application executing on the device that is associated with the keyboard input, based on the behavior history associated with a different application that previously executed on the device, based on the indication of current location of the device, and based on the indication of the identity of the subscriber, and based on at least one word in the partial keyboard input string. At block 208, the server keyboard application accesses a behavioral profile in a behavioral data store based on the indication of the identity of the subscriber. At block 210, the server keyboard application analyzes a return from the search of the keyword data store based on a current time, based on the behavior history associated with a different application that previously executed on the device, and based on the accessed behavioral profile.

At block 212, the server keyboard application determines a completion action based on the analyzing. At block 214, the server keyboard application transmits the completion action to the client keyboard application. At block 215, the client keyboard application provides a prompt associated with the completion action on the touchscreen of the device, whereby inputting data via the keyboard to the application executing on the mobile communication device is promoted.

At block 216, the client keyboard application captures keyboard input completion information. This keyboard input completion information may capture the input string which was ultimately selected for input by the user as well as one or more recommended completion actions received from the server keyboard application. This captured keyboard input completion information may be referred to as feedback information. At block 217, the client keyboard application transmits the keyboard input completion information. At block 218, the keyboard input completion information is analyzed. The keyboard input completion information may be transmitted to and analyzed by the server keyboard application or a different application executing on a different server computer. It is understood that this step of receiving and analyzing feedback information may be performed on feedback received from a large number of mobile communication devices, for example thousands or even millions of mobile communication devices.

At block 219, the process of analyzing returns from the search of the keyword data store based on analyzing the keyboard input completion information is adapted. Adapting may involve changing software, logic, or rules used by the server keyboard application to search the data store 134. Adapting may involve changing software, logic, or rules used by the sever keyboard application to analyze the returns from the data store 134 of the search. Adapting the process of analyzing returns from the search of the keyword data store applies to a plurality of mobile communication devices, for example the adapting applies to a plurality of mobile communication devices that are different from the mobile communication device that provided the keyboard completion information in addition to applying to the mobile communication device that provided the keyboard completion information.

Figure 3A:
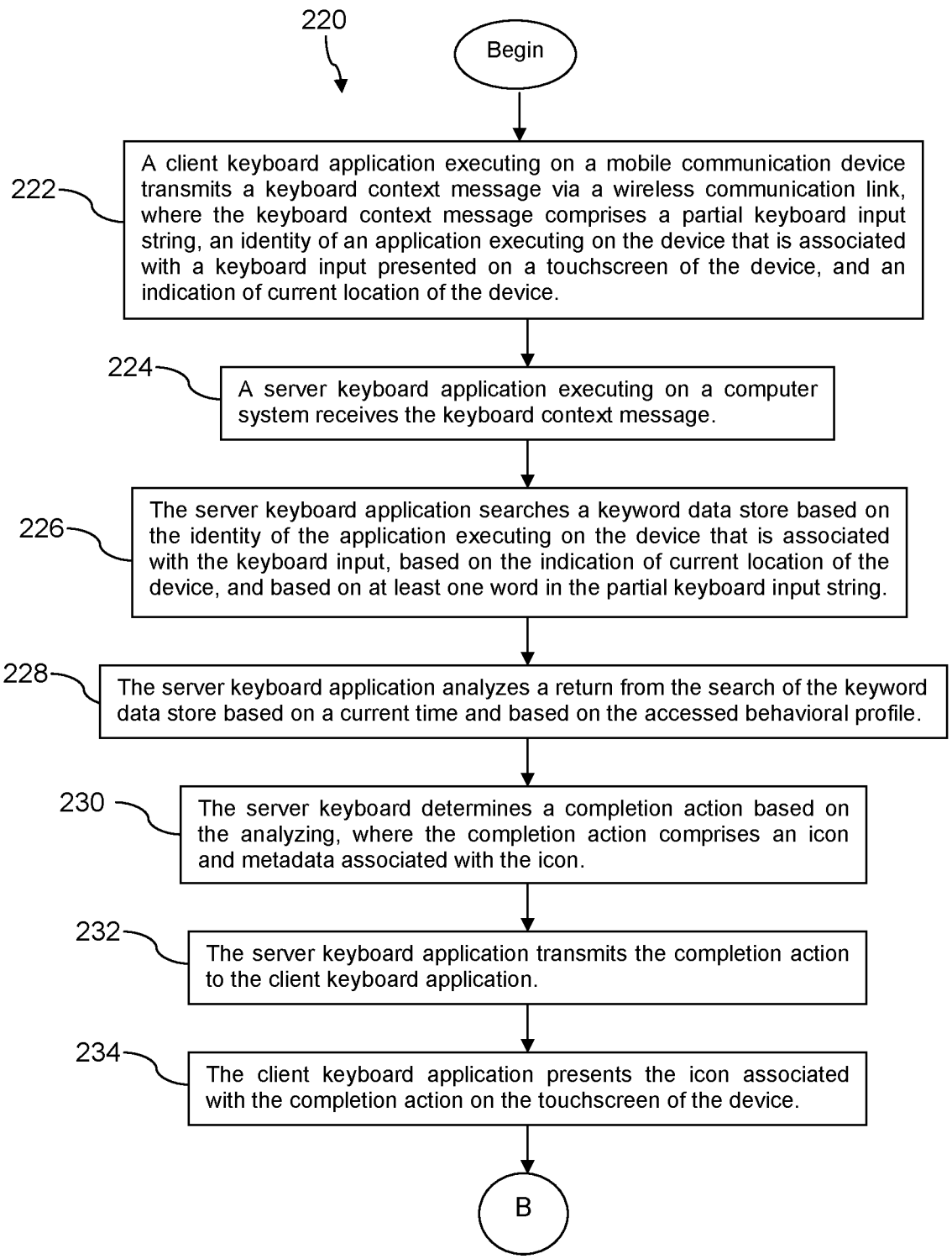
FIG. 3A and FIG. 3B are a flow chart of another method according to an embodiment of the disclosure.
Figure 3B:
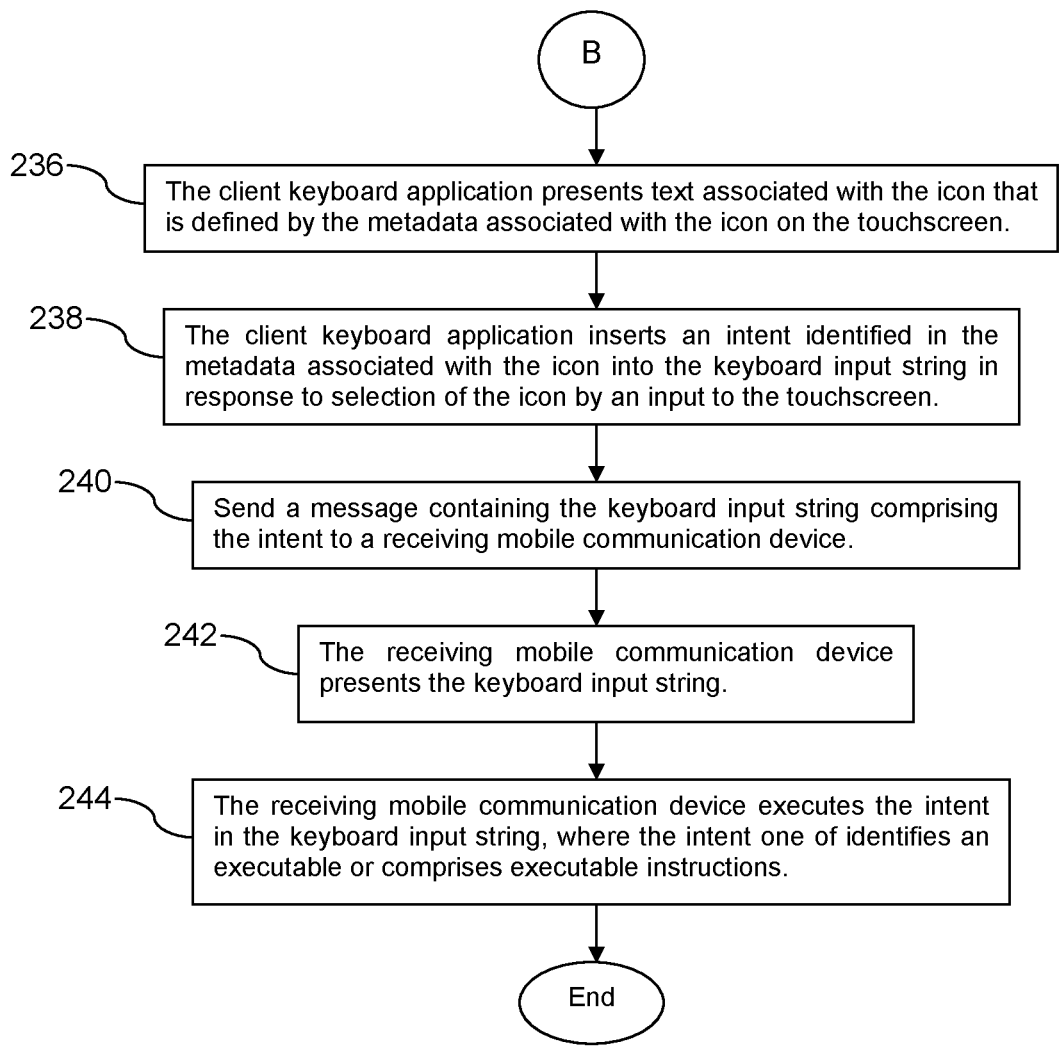

Turning now to FIG. 3A and FIG. 3B, a method 220 is described. At block 222, a client keyboard application executing on a mobile communication device transmits a keyboard context message via a wireless communication link, where the keyboard context message comprises a partial keyboard input string, an identity of an application executing on the device that is associated with a keyboard input presented on a touchscreen of the device, and an indication of current location of the device. At block 224, a server keyboard application executing on a computer system receives the keyboard context message. At block 226, the server keyboard application searches a keyword data store based on the identity of the application executing on the device that is associated with the keyboard input, based on the indication of current location of the device, and based on at least one word in the partial keyboard input string.

At block 228, the server keyboard application analyzes a return from the search of the keyword data store based on a current time and based on the accessed behavioral profile. At block 230, the server keyboard determines a completion action recommendation based on the analyzing, where the completion action recommendation comprises an icon and metadata associated with the icon. In an embodiment, the completion action recommendation defines a text completion content. At block 232, the server keyboard application transmits the completion action to the client keyboard application. At block 234, the client keyboard application presents the icon associated with the completion action on the touchscreen of the device. At block 236, the client keyboard application presents text associated with the icon that is defined by the metadata associated with the icon on the touchscreen.

At block 238, the client keyboard application inserts an intent identified in the metadata associated with the icon into the keyboard input string in response to selection of the icon by an input to the touchscreen. This may be referred to as embedding an intent or dropping an intent into a text message (SMS) or a multimedia message (MMS). At block 240, send a message containing the keyboard input string comprising the intent to a receiving mobile communication device. When the subscriber selects a "send" control of the GUI, the input string is completed and provided to the subject application, for example, a text message is sent by a texting application. This may entail the text message being transmitted via a wireless radio transceiver of the device where the text contains the text defined by the metadata to a terminating mobile communication device (i.e., a receiving device).

At block 242, the receiving mobile communication device presents the keyboard input string. At block 244, the receiving mobile communication device executes the intent in the keyboard input string, where the intent one of identifies an executable or comprises executable instructions. In an example, the intent identifies a navigation application and an address and executing the intent causes the navigation application to be executed on the receiving mobile communication device and to present a map to the address.

Figure 4:
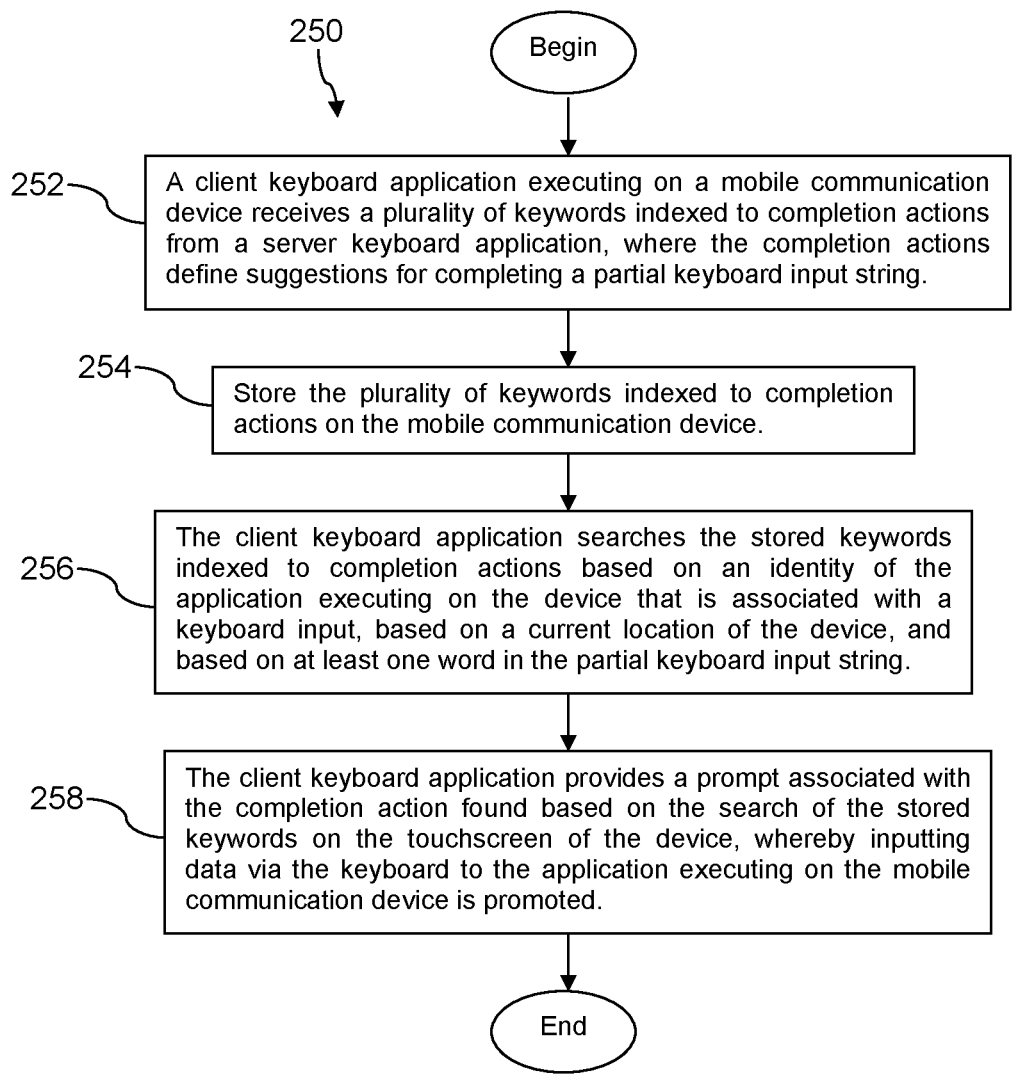
FIG. 4 is a flow chart of yet another method according to an embodiment of the disclosure.

Turning now to FIG. 4, a method 250 is described. At block 252, a client keyboard application executing on a mobile communication device receives a plurality of keywords indexed to completion actions from a server keyboard application, where the completion actions define suggestions for completing a partial keyboard input string. At block 254, store the plurality of keywords indexed to completion actions on the mobile communication device.

At block 256, the client keyboard application searches the stored keywords indexed to completion actions based on an identity of the application executing on the device that is associated with a keyboard input, based on a current location of the device, and based on at least one word in the partial keyboard input string. At block 258, the client keyboard application provides a prompt associated with the completion action found based on the search of the stored keywords on the touchscreen of the device, whereby inputting data via the keyboard to the application executing on the mobile communication device is promoted.

Figure 5:
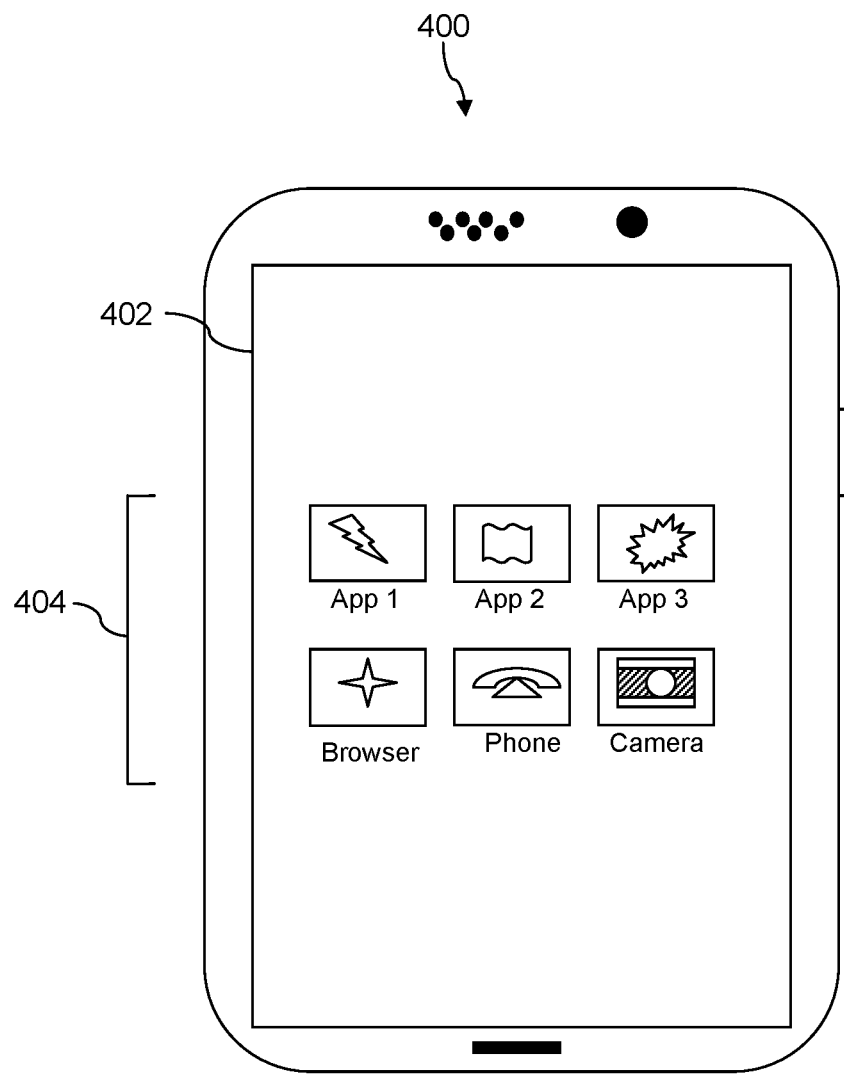
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
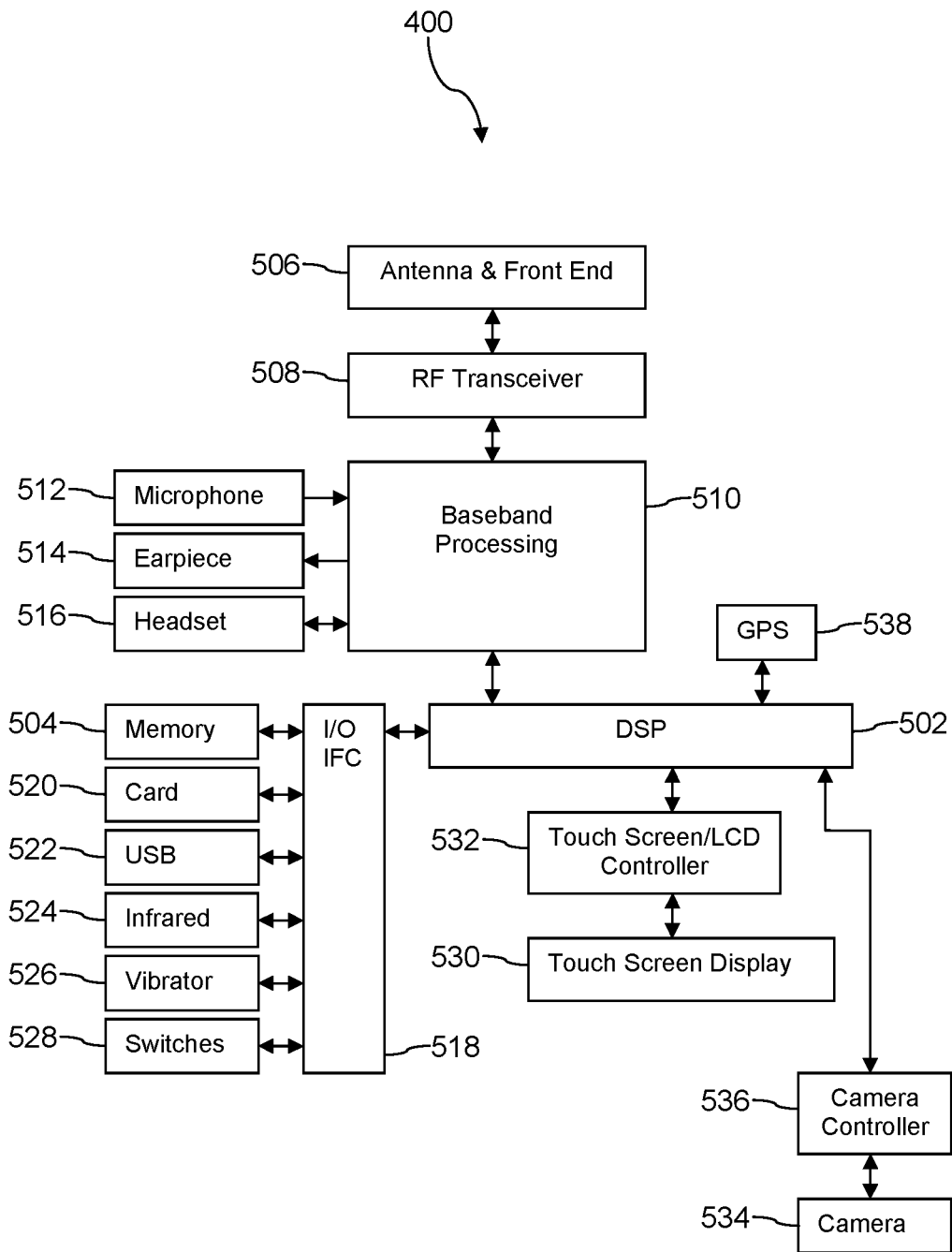
FIG. 6 is a block diagram of a hardware architecture according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
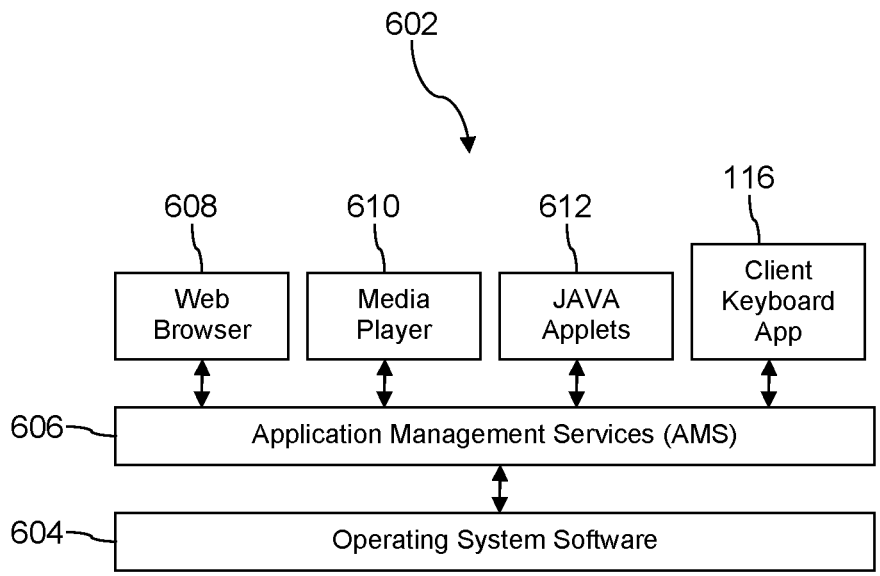
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
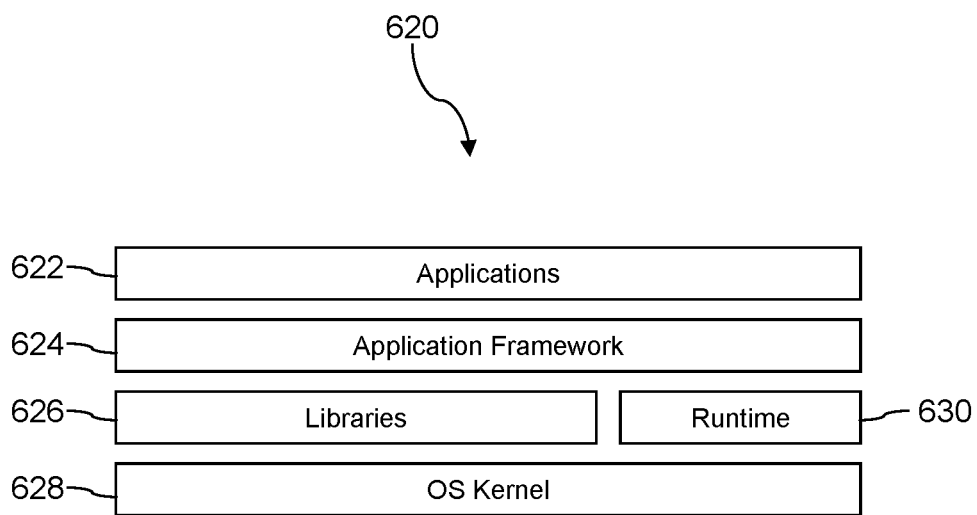
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
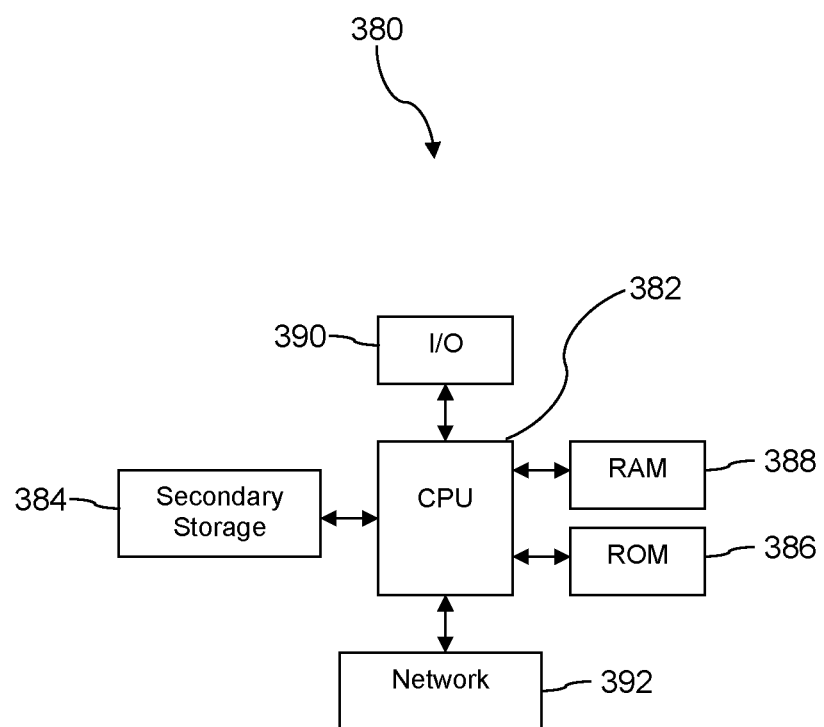
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a keyboard input on a touchscreen display of a mobile communication device, comprising:
    transmitting a keyboard context message by a client keyboard application executing on a mobile communication device via a wireless communication link, where the keyboard context message comprises a partial keyboard input string, an identity of an application executing on the mobile communication device that is associated with a keyboard input presented on a touchscreen of the mobile communication device, an indication of current location of the mobile communication device, and an indication of an identity of a wireless communication subscriber associated with the mobile communication device;
    receiving the keyboard context message by a server keyboard application executing on a computer system;
    searching a keyword data store by the server keyboard application based on the identity of the application executing on the mobile communication device that is associated with the keyboard input, based on the indication of current location of the mobile communication device, based on the indication of the identity of the wireless communication subscriber, and based on at least one word in the partial keyboard input string;
    analyzing a return from the search of the keyword data store by the server keyboard application based on a current time;
    determining a completion action recommendation by the server keyboard application based on the analyzing, where the completion action recommendation comprises an icon and metadata associated with the icon;
    transmitting the completion action recommendation by the server keyboard application to the client keyboard application;
    presenting the icon associated with the completion action recommendation by the client keyboard application on the touchscreen of the mobile communication device;
    presenting text associated with the icon that is defined by the metadata associated with the icon on the touchscreen by the client keyboard application;
    incorporating the text associated with the icon into the partial keyboard input string and inserting an intent identified in the metadata associated with the icon into the partial keyboard input string by the client keyboard application in response to selection of the icon by an input to the touchscreen;
    sending a message containing a completed keyboard input string comprising the text associated with the icon and the intent to a receiving mobile communication device;
    presenting the completed keyboard input string by the receiving mobile communication device; and
    executing the intent in the completed keyboard input string by the receiving mobile communication device, where the intent one of identifies an executable or comprises executable instructions.

2. The method of claim 1, wherein the completion action recommendation defines a text completion content based on a keyword in the partial input string and based on the location of the mobile communication device provided in the keyboard context message.

3. The method of claim 1, wherein the icon is a graphic of a direction and the metadata comprises a geographic address.

4. The method of claim 1, where the intent identifies a navigation application and a geographic address and executing the intent causes the navigation application to be executed on the receiving mobile communication device and to present a map to the geographic address.

5. The method of claim 1, wherein the client keyboard application is embedded in a texting application on the mobile communication device.

6. The method of claim 1, wherein the mobile communication device comprises a cell phone, a smart phone, a personal digital assistant (PDA), a media player, a wearable computer, a headset computer, a laptop computer, a notebook computer, or a tablet computer.

7. The method of claim 1, wherein the mobile communication device communicates with the computer system, at least in part, via a wireless communication link according to a long term evolution (LTE), a code division multiple access (CDMA), a global system for mobile communications (GSM), or a worldwide interoperability for microwave access (WiMAX) telecommunication protocol.

8. A method of providing a keyboard input on a touchscreen display of a mobile communication device, comprising:
    transmitting a keyboard context message by a client keyboard application executing on a mobile communication device via a wireless communication link, where the keyboard context message comprises a partial keyboard input string, an identity of an application executing on the mobile communication device that is associated with a keyboard input presented on a touchscreen of the mobile communication device, a behavior history associated with a different application that previously executed on the mobile communication device, an indication of current location of the device, and an indication of an identity of a wireless communication subscriber associated with the mobile communication device;
    receiving the keyboard context message by a server keyboard application executing on a computer system;
    searching a keyword data store by the server keyboard application based on the identity of the application executing on the device that is associated with the keyboard input, based on the behavior history of the different application that previously executed on the mobile communication device, based on the indication of current location of the mobile communication device, based on the indication of the identity of the subscriber, and based on at least one word in the partial keyboard input string;

accessing a behavioral profile by the server keyboard application in a behavioral data store based on the indication of the identity of the subscriber;

analyzing a return from the search of the keyword data store by the server keyboard application based on a current time, based on the behavior history of the different application that previously executed on the mobile communication device, and based on the accessed behavioral profile;

determining a completion action recommendation by the server keyboard application based on the analyzing, where the completion action recommendation comprises an icon and metadata associated with the icon;

transmitting the completion action recommendation by the server keyboard application to the client keyboard application;

providing a prompt including the icon associated with the completion action recommendation by the client keyboard application on the touchscreen of the mobile communication device, whereby inputting data via the keyboard to the application executing on the mobile communication device is promoted;

presenting text associated with the icon that is defined by the metadata associated with the icon on the touchscreen by the client keyboard application;

incorporating text associated with the icon into the partial keyboard input string by the client keyboard application in response to selection of the on by an input to the touchscreen;

sending a message containing a completed keyboard input string comprising the text associated with the icon to a receiving mobile communication device;

capturing keyboard input completion information by the client keyboard application;

transmitting the keyboard input completion information by the client keyboard application;

analyzing the keyboard input completion information; and adapting the process of analyzing returns from the search of the keyword data store based on analyzing the keyboard input completion information.

9. The method of claim 8, wherein the icon is one of a direction sign, a currency symbol, or a ticket.

10. The method of claim 8, wherein the keyboard context message contains the identity of a text messaging application executing on the mobile communication device.

11. The method of claim 8, wherein the keyboard context message comprises GPS coordinates of the mobile communication device.

12. The method of claim 8, wherein adapting the process of analyzing returns from the search of the keyword data store applies to a plurality of mobile communication devices.

13. The method of claim 8, wherein adapting the process of analyzing returns from the search of the keyword data store applies to a plurality of mobile communication devices that are different from the mobile communication device that provided the keyboard completion information in addition to applying to the mobile communication device that provided the keyboard completion information.

14. A method of providing a keyboard input on a touchscreen display of a mobile communication device, comprising:

receiving a plurality of keywords indexed to completion action recommendations by a client keyboard application executing on a mobile communication device from a server keyboard application executing on a computer system, where the completion action recommendations define suggestions for completing a partial keyboard input string;

storing the plurality of keywords indexed to completion action recommendations on the mobile communication device;

searching the stored keywords indexed to completion action recommendations by the client keyboard application based on an identity of an application executing on the mobile communication device that is associated with a keyboard input, based on a current location of the mobile communication device, and based on at least one word in the partial keyboard input string;

determining a completion action recommendation by the client keyboard application based on the searching, where the completion action recommendation comprises an icon and metadata associated with the icon;

providing a prompt including the icon associated with the completion action recommendation found based on the search of the stored keywords by the client keyboard application on the touchscreen of the mobile communication device, whereby inputting data via the keyboard to the application executing on the mobile communication device is promoted;

presenting text associated with the icon that is defined by the metadata associated with the icon on the touchscreen by the client keyboard application;

incorporating text associated with the icon into the partial keyboard input string by the client keyboard application in response to selection of the icon by an input to the touchscreen; and sending a message containing a completed keyboard input string comprising the text associated with the icon to a receiving mobile communication device.

15. The method of claim 14, further comprising accessing profile information associated with a subscriber of the mobile communication device based on an identity of the mobile communication device, wherein the completion action is further determined based on analyzing the profile information.

16. The method of claim 15, wherein the profile information comprises information about on-line purchases and navigating to performance venues.

17. The method of claim 15, wherein the profile information comprises demographic information comprising at least two of gender, age, income level, education level, residence location, marital status, or number of children.

18. The method of claim 14, wherein the mobile communication device comprises a cell phone, a smart phone, a personal digital assistant (PDA), a media player, a wearable computer, a headset computer, a laptop computer, a notebook computer, or a tablet computer.

19. The method of claim 14, wherein the mobile communication device communicates with the computer system, at least in part, via a wireless communication link according to a long term evolution (LTE), a code division multiple access (CDMA), a global system for mobile communications (GSM), or a worldwide interoperability for microwave access (WiMAX) telecommunication protocol.

* * * * *